(12) United States Patent
Chiba

(10) Patent No.: US 7,105,092 B2
(45) Date of Patent: Sep. 12, 2006

(54) SEWAGE TREATMENT PROCESS BY ACTIVATED-SLUDGE METHOD COMPRISING LINE ATOMIZING TREATMENT

(75) Inventor: Kousuke Chiba, Tokyo (JP)

(73) Assignees: C & R Co., Tokyo (JP); Kousuke Chiba, Tokyo (JP)

( * ) Notice: Subject to any disclaimer, the term of this patent is extended or adjusted under 35 U.S.C. 154(b) by 0 days.

(21) Appl. No.: 10/518,754

(22) PCT Filed: Jul. 18, 2003

(86) PCT No.: PCT/JP03/09167

§ 371 (c)(1),
(2), (4) Date: Dec. 21, 2004

(87) PCT Pub. No.: WO2004/009500

PCT Pub. Date: Jan. 29, 2004

(65) Prior Publication Data

US 2005/0258094 A1 Nov. 24, 2005

(30) Foreign Application Priority Data

Jul. 22, 2002 (JP) ............................. 2002-212598

(51) Int. Cl.
*C02F 3/00* (2006.01)
(52) U.S. Cl. .................. 210/620; 210/760; 210/220
(58) Field of Classification Search ................ 210/220, 210/620–630, 760
See application file for complete search history.

(56) References Cited

U.S. PATENT DOCUMENTS 4,337,152 A * 6/1982 Lynch ..................... 210/197

4,620,925 A * 11/1986 Allen .......................... 210/219
6,086,766 A   7/2000 Yasui
6,335,191 B1 * 1/2002 Kiplinger et al. ........ 435/252.1

FOREIGN PATENT DOCUMENTS

| EP | 0 881 195 A1 | 12/1998 |
|---|---|---|
| JP | 04-187298 | 7/1992 |
| JP | 09-117790 | 5/1997 |
| JP | 2000-033393 | 2/2000 |
| JP | 2002-210488 | 7/2002 |
| JP | 2003-053371 | 2/2003 |
| JP | 2003-080289 | 3/2003 |
| JP | 2003-126877 | 5/2003 |
| WO | 98/03437 | 1/1998 |

* cited by examiner

*Primary Examiner*—Chester T. Barry
(74) *Attorney, Agent, or Firm*—Wenderoth, Lind & Ponack, L.L.P.

(57) ABSTRACT

Disclosed is a waste water disposal process in the biosolid method according to a line atomizing treatment in which a reactive gas containing oxygen or oxygen and ozone as hardly soluble gases is dissolved/stored in water as being converted into ultrafine bubbles. The characteristic feature is that, by forming a gas-dispersion liquid in which the reactive gas containing oxygen or oxygen and ozone is dispersed in the form of ultrafine bubbles in returned biosolid water or in clean water at outside of the vessels (pools) of the waste water treatment system and by introducing the aforementioned gas-dispersion liquid into a reaction vessel (aerobic or anaerobic), oxygen is supplied to the microorganisms. Alternatively, the aforementioned gas-dispersion liquid is introduced into a vessel in the step preceding the reaction vessel or succeeding the reaction vessel. Further, the kind, concentration and volume of the reactive gas, the vessel (pool) for returning and the duration of introduction are set in accordance with the proceeding conditions of the waste water treatment and unitarily controlled.

8 Claims, 3 Drawing Sheets

SEWAGE TREATMENT PROCESS BY ACTIVATED-SLUDGE METHOD COMPRISING LINE ATOMIZING TREATMENT

TECHNOLOGICAL FIELD

The present invention relates to a waste water disposal by the biosolid method or, more particularly, to a waste water treatment process in the biosolid method in which a reaction vessel is fed with a gas-dispersion liquid having a reactive gas containing oxygen or oxygen and ozone in a dissolved form liquid or in the dissolved form and a fine bubble form to be dispersed, kept standing or stored.

BACKGROUND TECHNOLOGY

The biosolid method is now widely practiced for cleaning of waste water. The biosolid method is a method in which a biochemical treatment is undertaken by utilizing microorganisms and oxygen so as to immobilize organic pollutant substances in the waste water as bio-solid which is partly decomposed to form water and carbon dioxide (self-digestion) to be removed.

In a standard biosolid method, non-organic matters such as coarse suspended substances, sand and the like are removed, in a settling vessel (also called a settling pool) from the original waste water introduced into the waste water treatment system and the organic matters are decomposed by means of microorganisms in a reaction vessel under an anaerobic atmosphere (sometimes called an anaerobic vessel) to be converted into water-soluble substances and a biochemical reaction is conducted by means of microorganisms in a reaction vessel under an aerobic atmosphere (sometimes called an aeration vessel or aerobic vessel) followed by settling of the biosolid produced in the reaction vessel, in a biosolid settling vessel (also called a biosolid settling pool) and release of the supernatant water from the waste water treatment system along with recycling of a part of the biosolid into the reaction vessel and elsewhere as the recycled biosolid for recycling utilization of the microorganisms while the remainder of the biosolid as the excessive biosolid is, after treatments of dehydration, drying and the like, disposed by compost-forming or incineration or disposed by land filling.

The supernatant water is released to rivers and the like or subjected to an advanced treatment for further purification.

While, in many cases, the reaction vessel, biosolid settling vessel and others are installed each as an independent vessel (pool) (represented by "vessel" hereinafter) for an exclusive purpose, it is sometimes the case that a vessel is provided to exhibit functions of a plurality thereof in combination and that a single vessel is provided for utilization in a batch-wise manner. Also, there can be a case where vessels of other kinds such as, for example, an adjustment vessel and others are provided. In order to conduct the biochemical reaction by means of the aerobic microorganisms in the reaction vessel (aerobic) under an aerobic atmosphere, the dissolved oxygen is indispensable in the water under disposal.

In the reaction vessel (aerobic), it was the case that air was introduced by using an air disperser unit (bubbling) in order to promote the biochemical reaction. The utilization efficiency of oxygen, however, was very low because the diameter of the gas bubbles introduced into the disposal water by the air disperser unit was very large so that most part of the gas rapidly ascended in the disposal water to be dissipated from the water surface. Accordingly, there are means under practice in which aeration with standard air is replaced by aeration with oxygen-enriched air or pure oxygen, a great increase of the aeration volume is attempted and the depth of the vessel is increased to make efficient the water depth pressure thereby only to result in an increase of the power consumption or necessity of an excessive space for the reaction vessel.

On the other hand, the present status for the disposal of the excessive biosolid occurring in a large amount in the biosolid method is as follows.

1) A part is converted into compost.
2) A wet-process oxidative annihilation treatment is undertaken in part under a pressure of 4.99 MPa (50 kg/cm$^2$) or higher at a temperature of 243° C. or higher.
3) A biogas recovery method by biosolid digestion is now under way of development.

It is, however, the usual case that the excessive biosolid is disposed by concentration, carrying-out, incineration and land filling and the disposal cost, bad smells, $CO_2$ emission and others belong to the fatal problems of the biosolid method and fundamental solutions remain unpracticed in the present status.

As a measure for volume reduction of the excessive biosolid, practice is also under way for the application of gaseous ozone to a waste water treatment system by the biosolid method (official publication of Patent Publication No. 5-85236, official publication of Patent Ko-kai No. 6-206088, official publication of Patent Publication No. 57-19719 and elsewhere).

According to the official publication of Patent Publication No. 5-85236, the disclosures given include that "the microorganisms are activated by ozone simultaneously with the deodorizing activity and oleaginous matter decomposing activity" to be exhibited and, besides, "according to the present invention, the organic substances contained in the waste water are decomposed mainly to carbon dioxide and water so that occurrence of biosolid can be prevented".

According to the official publication of Patent Kokai No. 6-206088, a disclosure is given that "when reacted with an ozone-containing gas, the extracted biosolid is converted into BOD by causing oxidative decomposition".

According to the official publication of Patent Publication No. 57-19719, the disclosure says: "When the biosolid is contacted with ozone, the organic matters in the suspended substances constituting the bio-solid are decomposed by the organic-decomposing activity of ozone leading to the formation of another biosolid of which the constituents are different from those in the biosolid before contacting with ozone. When this biosolid is added to the reaction vessel, the living organisms in the vessel take up the same as the nutrient source so that the suspended substances having a decreased molecular size by ozone are decomposed to result in a decrease of the SS."

Contacting of an ozone-containing gas with the disposal water in these prior art technologies is undertaken always by using the means of bubbling in the same manner as in the aforementioned oxygen gas. It is therefore that the size of the bubbles of the ozone-containing gas is about 1 mm or in the order of submillimeter for the smallest so that the dissolving rate of ozone into water is so low that the dissolution and utilization efficiency would presumably be low.

The above-described prior art technologies always involve the step of oxygen aeration with oxygen gas or an ozone-containing gas as a hardly dissolvable gas and always employ the process elements common to all as such so that almost no improvements are attained in the dissolving rate and the dissolution efficiency.

The characteristics in the process elements thereof involve:

1) that they are each a tank-type biosolid oxidation method with ozone (being commonly of the tank-type in which aeration is effected by bubbling into a tank);
2) that they are each a method of aeration and oxidation under superlow pressure by utilizing the tank water-depth pressure onto the installation position of the gas disperser unit;
3) that, usually, they are each for aeration with air-dispersion type coarse bubbles of air (ozonated gas) so that the dissolving rate and the dissolution/utilization efficiency of oxygen/ozone are extremely low;
4) that, for the reasons of the above described factors, they are each a process in which a large-size aeration vessel and a large-size reaction vessel are needed;
5) that, for the reasons of the same factors described above, they are each a process with consumption of a large power for the aeration and for ozone generation;
6) that, while it is described that oxidative decomposition treatment of biosolid with ozone is possible by means of an OHR line mixer described later, this is in a stage of mere idea only and has not yet been practiced in the present status because of the limitation in the gas/liquid proportion by the admixture of ozone gas;
7) that the aforementioned mixer which enables formation of ultra-fine bubbles is under a trouble by possible occurrence of blockage by the undissolved solid matter when in a waste water treatment system so that it is understood not to be suitable for application to the aeration step; and
8) that there cannot be found a compact and energy-saving type disposal method enabling high-concentration, high-load waste water treatment and free from occurrence of excessive biosolid.

DISCLOSURE OF INVENTION

The problems of the present invention include, in a waste water treatment process by the biosolid method, improving the dissolving rate, dissolved volume and dissolution/utilization efficiency in water of oxygen gas or a reactive gas containing oxygen and ozone so as:

1) to promote the biochemical activity of aerobic microorganisms with oxygen;
2) to activate microorganisms with a trace volume of ozone;
3) to greatly increase the waste water treatment performance as compared with the prior art by way of a synergistic composite effect of cavitation and ultrasonic activity simultaneously with the function of oxidation/decomposition by a relatively large amount of ozone; and
4) to unitarily control the above-mentioned 1), 2) and 3).

To say particularly, the problem is to realize the unsolved problems remaining as they are as the "fatal problems" in the biosolid method including 1) enabling curtailing the excessively large space;
2) reducing power consumption such as the power for aeration to accomplish energy saving;
3) controlling the waste water treatment system by the biosolid method compositely and efficiently;
4) enabling adaptation/disposal of waste water with high concentration and high loading;
5) reducing or annihilating excessive biosolid; and
6) preventing, in addition to the above, generation of malodors, $CO_2$ and dioxins;

In order to solve the above-described problems, the line atomizing waste water treatment method of the present invention is characterized in that, in a waste water treatment process by the biosolid method, an aqueous medium consisting of a returned biosolid water or clean water is admixed with 50 volume % or less of a reactive gas consisting of oxygen or a mixed gas of oxygen and ozone and pressure-transferred by pumping to a line atomizer under about 0.0981 MPa to about 5.394 MPa (1 to 55 kg/cm$^2$) so as to cause, as a result of the interaction of cavitation/ultrasonic waves of 20 to 12000 kHz, in the atomizer, an O/OH radical molecules/atoms reaction is caused by the interaction/impact of an ultrahigh temperature/high pressure (several thousand degrees and several thousands atmospheres, and dissolving of the reactive gas to the limit, where, when a remainder of the reactive gas is found, the remaining activated gas is dispersed and mixed in a bubble diameter of 1 nm to 30000 nm to form a dissolution/dispersion liquid of the activated gas while the aforementioned dissolution/dispersion liquid of the activated gas is introduced into the sewage under treatment.

It is preferable that: the BOD loading of the aforementioned waste water under treatment can be in the range from 50 to 200000 mg/liter, the ozone concentration of the aforementioned activated gas can be 0.01 to 0.04 mg/liter, the time for limit dissolution of the aforementioned reactive gas in the atomizer can be 0.5 second or shorter, and, in accordance with the proceeding conditions of waste water treatment, the kind of the reactive gas, concentration, volume, the vessel or pool for returning and the duration for introduction as set are managed unitarily.

EXPLANATION OF SIGNS

Figure 1:
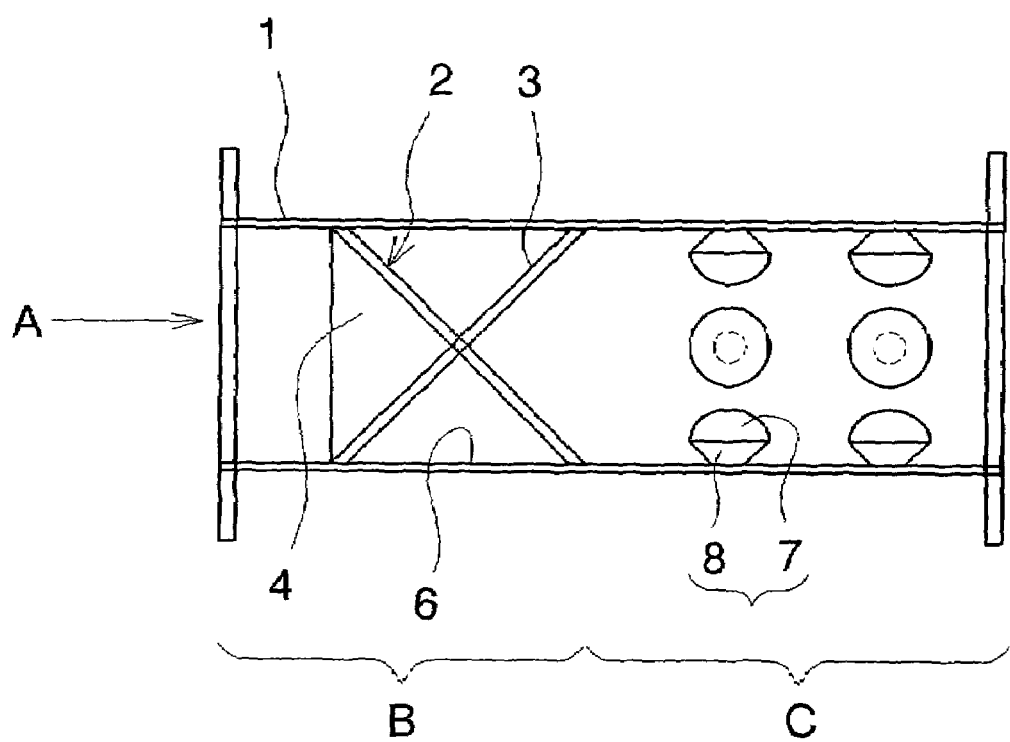
FIG. 1 is an illustrative drawing showing an example of the gas-liquid mixer which can be satisfactorily used as the atomizer in the present invention.

1: tube
2: blade panel
3: chord-side side edge (of the blade panel)
4: partitioning plate
6: inner peripheral wall (of the tube)
7: head portion of hemisphere
8: leg portion
9: protrusion
10: stator
11: rotor
12: waste water
13: (flow rate) adjusting vessel
14: settling vessel
15: reaction vessel (anaerobic)
16: reaction vessel (aerobic)
17: biosolid-settling vessel
18: supernatant liquid
19: pipeline for biosolid suction
20: atomizer 21: gas-liquid pressure-transfer pump
22: oxygen/ozone cycle generator
23: line atomizer (generically for 20/21)
24: pipeline for reactive gas (containing oxygen)
25: pipeline for reactive gas (containing oxygen and ozone)
26: pipeline for returning/introducing
27: stirrer
28: dispenser system for microbial preparation
29: sensor
30: line atomizer system (generically for 20/21/22)

BEST MODE FOR PRACTICING THE INVENTION

In the waste water treatment process according to the biosolid method, the present invention has accomplished to transfer under pressure of a gas-liquid with a high gas/liquid ratio of a desired liquid and a reactive gas of oxygen as a hardly dissolvable gas or oxygen and ozone into an atomizer having a function for rendering the gas-liquid into ultrafine bubbles or forming a mixture and having a function to generate cavitation and ultrasonic waves under a high pressure and by the aforementioned atomizer treatment, the reactive gas is caused to be dissolved in the aforementioned gas-liquid to give a gas-dispersion liquid, when the activated gas still remains, while the same is introduced into a reaction vessel where the biochemical reaction is promoted by sufficient aeration (supply of dissolved oxygen) or, alternatively, in the course of formation of the gas-dispersion liquid in the aforementioned line atomizer, the ozone-oxidation decomposition reaction is effected instantaneously and the same is introduced into vessels/pools other than the reaction vessel so that these vessels/pools are imparted with a function of biological treatment to make composite of the functions of the vessels/pools along with 1) the step of oxygen aeration dissolution/staying/storage, 2) the step of ozone oxidative decomposition and 3) the step of biosolid returning unitarized in the biosolid-returning line so as to enable control and management to accomplish decreasing or disappearance of excessive biosolid and enabling disposal of even high-loaded waste water and further to accomplish space saving, energy saving and manpower saving.

In the following, the present invention is described in detail successively.

If oxygen gas (air)/ozone and the like could be imparted with increased dissolving rate, dissolvable volume and dissolving efficiency into water, it would be within thought that the performance of waste water treatment could be improved due to promotion of the biochemical activity by microorganisms but no particular proposals have been made heretofore based on such an idea.

It is well known that, in order to accomplish good dissolution of a gas such as oxygen gas (air)/ozone into water, it is effective:

1) to decrease the size of the gas particles (bubbles) (to increase the gas-liquid contacting interface for extension of the time for ascending of the bubbles);
2) to increase the number of the gas particles (bubbles);
3) to increase the gas pressure or to increase the pressure of gas-liquid mixture;
4) to increase the concentration of the gas (reactive gas) and to increase the aeration volume;
5) to increase the volume capacity of the reaction vessel; and
6) to decrease the liquid temperature; and others.

In the present invention, 1), 2) and 3) mainly among the above can be accomplished and, besides, making a possibility of using oxygen in place of air in 4), so as to accomplish energy saving and manpower saving by decreasing the vessel volume, space and aeration volume.

By means of a line atomizing treatment, in the present invention, a desired volume of the reactive gas is instantaneously and rapidly dissolved, the remainder being dispersed/staying/stored in the liquid in the form of ultrafine bubbles so that the liquid holding the thus dispersed/staying/stored reactive gas can be returned/introduced satisfactorily to the aeration treatment process in a dissolved state or in the form of ultrafine bubbles suitable for utilization.

The liquid to be used for the gas-dispersion liquid can be clean water (which can be the water separately taken from outside of the waste water treatment system or can be the supernatant water within the waste water treatment system) or can be the biosolid water under returning (returned biosolid water).

The most efficient embodiment is the case where the reactive gas is added to a returned biosolid water of high concentration or to excessive biosolid water. In an actual practicing, however, the liquid to be used for the gas-dispersion liquid can be obtained by utilization of well-balanced returning of the biosolid water (biosolid concentration 2 to 200000 mg/liter) but, in the case of sudden increase of the concentration in the introduced waste water, in the case of shortage of the returned volume with the biosolid water only or in the case of better availability of out-system water, clean water from outside of the system can be utilized. According to the present invention, the object can be fully accomplished even in the case of using such an out-system liquid by supplying a small amount of the gas-dispersion liquid because a large volume of the reactive gas can be dispersed/can stay/can be stored in the gas-dispersion liquid. Incidentally, the economical merit is never decreased even in the case of supplying the gas-dispersion liquid to outside of the disposal plant.

1) With Respect to Size Reduction of Gas Particles (Bubbles)

According to the present invention, size reduction of gas particles (bubbles) can be accomplished by means of a treatment with a line atomizer (0.5 second or shorter of one-pass treatment time) having performance of vortex-flow mixing of a gas-liquid (liquid containing a gas) to convert the gas into ultrafine bubbles so that a part thereof is dissolved in the gas-liquid (gas-dispersion liquid), the remainder converted into ultrafine bubbles being in dispersion/staying/storage.

The size of the oxygen gas particles (bubbles) in dispersion/staying/storage in the gas-liquid in the form of ultrafine bubbles is desirably 30 µm or smaller as an average bubble diameter in order to be in accordance with the biochemical reaction rate of microorganisms by successive dissolution of the undissolved oxygen in dispersion/staying/storage in the form of ultrafine bubbles as the oxygen in a dissolved form becomes consumed by the biochemical reaction of microorganisms. It is preferably 1 µm or smaller.

A bubble diameter for aeration of 1 µm is outside of the practice record in the history of the waste water business. The bubble diameter at the world-wide highest level heretofore would be 1 mm=1000 µm.

To make comparisons between bubbles having a bubble diameter of 1 µm according to the present invention and bubbles having a bubble diameter of 1000 µm;

a) the volume ratio per single bubbles is about one $10^9$th;
b) the ratio of the numbers of generated bubbles is about $10^9$ times;

c) the ratio of the surface areas per single bubbles is about one millionth; and d) the ratio of the overall surface areas is about 1000 times, clearly indicating the difference in the contacting areas due to conversion into fineness. With regard to the effectiveness of the present invention, while it is known that the effectiveness thereof is rapidly Increased as the bubble diameter is decreased smaller and smaller, the smallest diameter is taken as 1 nm in the applicable range of the bubble diameter from economical consideration including the very great amount of the waste water for disposal. On the other hand, when application is intended to a ready-built waste water treatment plant in a public waste water system for disposal of a very huge amount in a one million tons/day scale (in particular when the disposal capacity has a surplus margin), the maximum diameter is set at 30000 nm because the economical advantages can be fully obtained by fine bubble formation set at around 30 μm.

With regard to retarding effect on the ascending velocity of bubbles in water due to fine bubble formation, the ascending velocity of bubbles in water is about 1 m/hour for a particle diameter of bubbles of about 30 μm and about 0.005 m/hour or smaller for about 1 μm (according to the Stokes' Law). When the ascending velocity of bubbles in water be as above, they can exhibit a function of storage because they can stay for such a long time sufficient to immediately and in situ replenish consumption of dissolved oxygen by the biochemical reaction of the pollutant substances in water for disposal and because they are dispersed in the form of ultrafine bubbles in the water uniformly and in a large amount in the vicinity of the site of consumption.

By this fact, it is possible to supply and store, within a very short time, oxygen or a desired reactive gas containing oxygen and ozone in a sufficient amount as desired with no excess nor shortage to shorten/promote the biochemical reaction along with a possibility of intermittent supply thereof where continuous supply within the time is not always required for conducting the biochemical action.

By utilizing the above-described phenomenon of ascending retardation/acceleration of oxygen bubbles, furthermore, it is possible to promote the biochemical reaction by introducing the gas-dispersion liquid to the reaction vessel leading to a more compact reaction vessel and to an increase of the treatment capacity of the reaction vessel and possible expectation is not limited thereto but can extend to the following new process modes which are not thought of absolutely in the prior art process of the biosolid method.

a) By introducing a gas-dispersion liquid containing biosolid with dissolution/dispersion/staying/storage of a reactive gas containing a trace amount of ozone or oxygen into the adjustment vessel (optionally employed in order to mitigate the variation in the loading of organic matter for treatment in the waste water), settling vessel or pumping vessel in the step preceding the reaction vessel located nearer to the waste water inlet port thereby adding a function of biological treatment to the inherent functions exhibited by the respective vessels/facilities by which it is possible to render the performance exhibited by the respective vessels/facilities into composite functions.

b) By introducing the aforementioned gas-dispersion liquid into the aforementioned adjustment vessel or settling vessel, these vessels can exhibit the performance of the reaction vessel (the function of biological treatment) so that, when these vessels have a sufficient BOD loading capacity, the biochemical reaction can be completed in these vessels accordingly leading to a possibility of dispensing with the above-described reaction vessel.

c) When the line atomizer used is a compact one, furthermore, a possibility is obtained for a practicing mode of the dispersion-type biological treatment process by introducing the gas-dispersion liquid into many waste water pits of restaurants and the like, 5 to 10 pumping stations, large-diameter tubular culverts leading to the disposal plant and others found in the course leading to the terminal waste water treatment plant to which waste water is usually collected.

d) One of the practicing modes is a circuit service in which a set of the apparatuses according to the present invention is mounted on a mobile truck which serves for ozone oxidation treatment of stored excessive biosolid (biosolid concentration 10000 to 200000 mg/liter) in a medium to small scale waste water treatment plant (apparatus).

2) With Regard to Increasing the Number of Gas Particles (Bubbles)

Even when the gas particles (bubbles) of the reactive gas containing oxygen or oxygen and ozone dispersed in a liquid have a size of 30 μm or smaller or, preferably, 1 μm or smaller, as is mentioned before, there can be a case, with a small number of the gas particles (bubbles), that the gas is consumed so rapidly that, especially when the waste water for treatment is high-loaded waste water, a difficulty is encountered in replenishing the same.

The number of gas particles (bubbles) is determined by the volume ratio of the gas mixed to the liquid. As to the volume ratio of the liquid and gas to be subjected to atomizing, the gas should occupy 50% by volume or smaller. The feed amount of oxygen is determined depending on the quality condition of the waste water for treatment BOD and COD loading values and the amount of ozone to serve for the ozone oxidation decomposition is determined depending on the generated amount of the excessive biosolid. The volume of the gas to be introduced is determined to be optimized on the base of the quality condition of the waste water and the working time of each cycle of the oxygen cycle, ozone cycle and intermittent cycle as well as on the base of the concentration of the introduced gas.

3) With Regard to Increasing the Gas-Liquid Mixing Pressure

Dissolution of a gas into water proceeds more rapidly and in a larger amount as the pressure condition is higher. Under a high-loading condition in which the reactive gas consumed in the waste water under treatment must be replenished immediately within a shorter time, the dissolving rate, dissolution efficiency and dissolving capacity of a gas can be increased by increasing the gas-liquid mixing pressure. While it is the prior art that the pressure is increased by increasing the injection pressure of the gas or by utilizing the head pressure of water in a tank as being unaccompanied by a technology for forming committed bubbles with limited effectiveness, pressurization, generation of cavitation and ultrasonic waves, formation of ultrafine bubbles and high-pressure dissolution can be accomplished in the process of treatment with a line atomizer according to the present invention. Though not particularly limitative in principle, the applicable pressure can be limited relative to the upper limit adequately depending on the pressurizing performance of the apparatus used.

While pressurization up to about 29.42 MPa (300 kg/cm$^2$) is required in a conventional mixer in order for ultrafine bubbles of 1 μm or finer to be generated by simple pressurization, such can be accomplished in the present invention without necessitating particular pressurization by an atomizer of preferred use having a structure which enables generation of cavitation and ultrasonic waves and it is also possible under pressurization of about 0.294 to 1.098 MPa (3 to 10 kg/cm$^2$) to cause generation of an O radical-forming reaction and OH radical-forming reaction in addition to the formation of ultrafine bubbles.

In the present invention, a "pressure" relative to the line atomizer system implies the discharge pressure at the exit of the pump for pressure-transfer of the gas-liquid described later.

4) With Regard to Increasing the Gas Concentration

No particular limitation is laid on the concentration of oxygen gas (air) or ozone gas for use. Selection can be made from gases of a concentration used conventionally depending on the types/contents of the disposal to the waste water by oxygen and/or ozone. When the requisite gas is oxygen, air may be suitable or oxygen gas-enriched air may be suitable or pure oxygen may be suitable. The proportion of oxygen gas enrichment can be appropriately selected (for example, an oxygen concentration of 90% by volume is usual in the present status of the oxygen-producing technology). Needless to say, air, from which a part of nitrogen has been removed, can be used. Selection/decision should be made by conducting an optimized planning depending on the condition of the water quality loading of the water for treatment.

With respect to ozone, a gas of an appropriate concentration can also be used.

In the present invention, meanwhile, uniform dispersion and long-term staying/storage of oxygen/ozone can be accomplished to the water under treatment by means of formation of ultrafine bubbles to greatly increase the utilization efficiency thereof enabling searching/estimation of the actually requisite amount of oxygen/ozone so that there no longer is need for excessive supply. The consumption efficiency of oxygen/ozone can be maximized so that a solution is provided for the problems in the prior art methods due to large aeration volumes, large capacity tanks and large power consumption with applicability to high-loading waste water, accomplishment of energy saving and man-power saving and possibility of unitary and efficient control/management of the waste water treatment system by the biosolid method simultaneously with the absence of need to provide a process for the detoxication treatment of ozone.

5) With Regard to the Liquid Temperature

As to the liquid temperature, there is no particular limitation in principle. Assuming that the only matter to be considered is dissolution of the gas to water, the liquid temperature should desirably be low but, depending on the types/contents of the treatment for the water, a higher efficiency can be obtained with an adequately high liquid temperature in chemical reactions as well as in biochemical reactions. The ambient temperature of environment or room temperature may be suitable when the cost for heating/cooling is taken into consideration.

In the present invention, a line atomizer is employed in order to disperse a gas into a liquid in the form of ultrafine bubbles.

The line atomizer is a set of apparatuses consisting of a gas-liquid pressure-transfer pump capable of pressure-transferring a gas-liquid (gas-containing liquid) in a gas-liquid ratio not exceeding 50% by volume under a pressure of about 0.0981 to 5.394 MPa (1 to 55 kg/cm$^2$) and an atomizer capable of exhibiting a function of subjecting the aforementioned gas-liquid to vortex flow/mixing under a high pressure (about 0.0981 to 5.394 MPa (1 to 55 kg/cm$^2$) to generate cavitations and ultrasonic waves of 20 to 12000 kHz either singly or simultaneously thereby converting the aforementioned gas-liquid into ultrafine bubbles of 1 nm to 30000 nm bubble diameter and further to form O radicals and OH radicals while a line atomizer system implies a system in a series consisting of the aforementioned line atomizer and an oxygen and/or ozone feed unit or preferably an oxygen/ozone cycle generator and capable of effecting unitary running control depending on the conditions of waste water treatment.

The atomizer can be used regardless of the form provided that it is suitable for efficiently dispersing/mixing into fine (ultrafine) bubbles to be stored in the liquid.

Usable atomizers include, for example, those consisting of the static-type mixers in a multistage arrangement or in a parallel arrangement for the respective functions. As a preferable example of the atomizers, there can be named the "stirrer apparatus" used in the "ozone reactor" (official publication of Patent Kokai No. 7-124577).

The "stirrer unit" (mixer) described in the official publication of Patent Kokai No. 7-124577 is as illustrated in FIG. 1.

In FIG. 1, it is constituted from two semi elliptical blade plates 2 approximately having similarity disposed at the fluid-inlet side A of the tube 1 in such a fashion that the chord-side peripheries 3 of the blade plates 2 face each other and intersect symmetrically relative to the center axis of the tube, a triangular partition plate 4 dividing the cross section of the tube into blocks of about equal two parts between the chord-side peripheries 3 of the two blade plates positioned at the fluid-inlet side intersecting part, a flow-deflecting part B formed by fixedly bonding the arched peripheries of the blade plates (peripheries opposite to the chord-side peripheries 3 of the blade plates 2 to the inside surface 6 of the tube 1 and a reaction part C formed integrally from a semispherical head part 7 having the head top directed to the axial direction of the tube on the internal wall 6 of the tube succeeding the said flow-deflecting part and a leg part 8 having at least one protrusion 9 in the form of an inversely truncated cone disposed radially relative to the axis of the tube 1.

It is said that, in this "stirrer unit", ozone air and the water for treatment are brought into a revolutional movement by passing the blade plates disposed in intersection and agitated/mixed while exhibiting a phenomenon of cavity (cavitation) by way of hitting at the group of protrusions 9 having a unique configuration. It is said that "violent acoustic vibrations are encountered by means of the acoustic effect at the inner part of the revolutional flow".

In the "ozone reactor" of the official publication of Patent Kokai No. 7-124577, a "gas supply tube" is connected to the intermediate part of the pipeline connecting a "circulation pump" and a "stirrer apparatus at the fluid inlet side to conduct "decoloration, deodorization, disinfection and others" of the waste water.

In this "stirrer unit" (named also as an 'OHR line mixer'), it has been ascertained that the gas mixable therein is not limited to ozone.

By means of this "stirrer unit" (OHR line mixer), it would be possible to accomplish uniform dispersion and mixing of ultrafine bubbles of about 0.5 to 3.0 μm or finer into a liquid within a short time required for passing the gas-liquid mixer if a gas and a liquid could be introduced into a gas-liquid mixer using a single machine. In addition, a crushing activity is partly exhibited to the solid matter contained in the fluid. The time required for passing a gas-liquid mixer, which depends on the flow velocity, is about 0.01 to 0.4 second (a pressure of about 0.0490 to 0.392 MPa (0.5 to 4 kg/cm$^2$) assumed). With regard to the atomizers, incidentally, the manner of disposition thereof can be such that, depending on the water-quality loading condition of the introduced waste water with a BOD of 50 to 200000 mg/liter and the maximum amount of waste water treatment of 2000000 m$^3$/day and the condition of, installation layout, atomizers each directed to a specific purpose of biosolid returning, oxygen aeration or ozone treatment of excessive biosolid are provided in parallel in addition to FIG. 3 described later, multiple-purpose ones are used, two- or three-stages series installation is adopted or a bypass pipe-line is provided with a purpose of biosolid to the anaerobic process or provided in the preceding stage of pump depending to the performance of the pump for enabling to accord with the optimum planning under the respective conditions.

A gas and a liquid are pressure-transferred to the gas-liquid mixer by using a gas-liquid pressure-transfer pump. It is desirable in this case that the same has a capacity of pressure-transfer which is not subject to a decrease even when the mixing proportion of the gas is increased to 3% by volume or higher.

While, in a conventional pump for liquid feeding, gas-lock or airlock is caused by intermixing of a gas to the liquid leading to a rapid decrease of the feeding capacity and substantial incapability of feeding when the intermixed gas occupies 6 to 8% by volume, it is presumable, though not explicitly mentioned, that the intermixing amount of "ozone air" in the aforementioned official publication of Patent Kokai (official publication of Patent Kokai No. 7-124577) is used also at a constant value within a range not exceeding "6% by volume".

Since differences are caused in the feeding capacity when a gas is intermixed to the liquid, it was a presupposition in the prior art that a gas is intermixed with the liquid in the case of using a conventional pump. However, even a conventional pump can be regarded as the gas-liquid pressure-transfer pump when used in such a way in the sense that a gas can be intentionally intermixed with the liquid or in the case where the waste water treatment loading conditions are sufficient to comply with a small amount of the gas.

In addition, it was the case before the present invention that large volume oxygen aeration was considered impossible, though possible to dissolve a few % of high-concentration ozone gas, due to blocking with undissolved solid matters and limitation in the "gas-liquid mixing proportion" with a presupposition of absolute impossibility relative to the oxygen aeration process by the treatment with a line atomizer, which was the characteristic feature of the present invention, ozone oxidation/decomposition treatment of excessive biosolid and so on as the waste water loading is increased, excessive biosolid having a BOD of 10000 to 200000 mg/liter was disposed exclusively by land-filling or by incineration.

It is preferable that the pump for pressure-transfer of a liquid intermixed with a gas is a gas-liquid pressure-transfer pump which is not subject to a decrease in the pressure-transfer capacity even with an increased proportion of the gas. "Mohno Pumps" marketed from Heishin Sobi Co. are known, for example, as a kind of such pumps.

Figure 2:
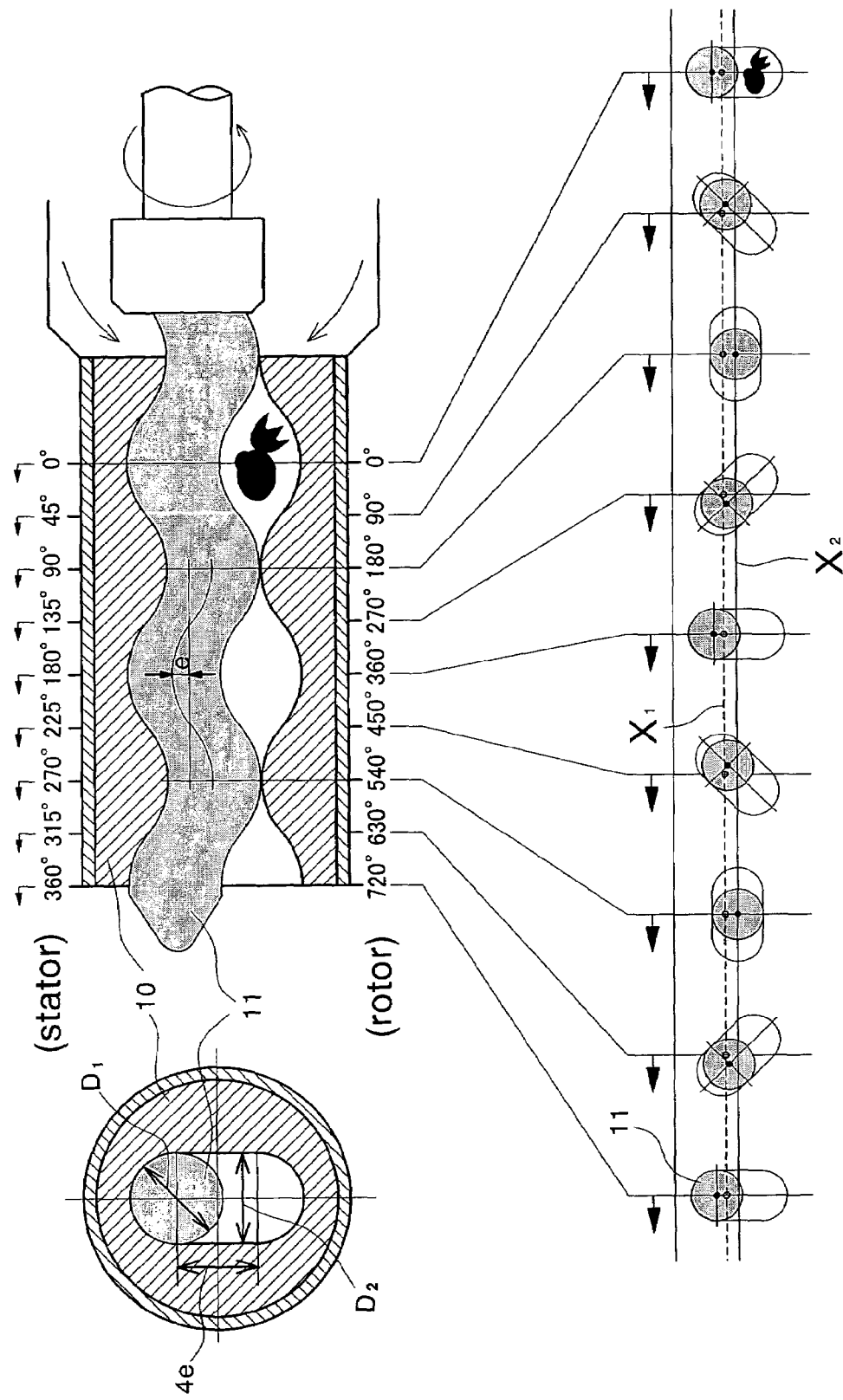
FIG. 2 is an illustrative drawing showing an example of the gas-liquid pressure-transfer pump most satisfactorily usable in the present invention.

As is illustrated in FIG. 2, the "Mohno Pump" is a metering feed pump of the type in which a spiral-formed rotor 11 of a circular cross section in the form of a spiral having a large pitch is rotated within a gap space of a female screw within the stator 10 having a female screw-formed space bored therein having an oblong cross section to cause successive movement of the gap space formed by the stator and the rotor so that the material in the gap space is transferred. Incidentally, there is shown, in the lower part of FIG. 2, the relationship of the space formed by boring in the stator and the rotor at the respective positions. In FIG. 2, $X_1$ is the center axis for rotation of the rotor and $X_2$ is the center axis of the stator. It is understood therefrom that 2 pitches of the rotor spiral correspond to a single pitch of the space formed by boring the stator.

They are proposed as applicable to application objectives of a wide variety including bubbles/fibers-containing liquids and readily vaporizable liquids as well as concentrated biosolids, dehydrated cakes, powders and so on. Pressure-transfer of feeding objectives can be performed without any troubles and the feeding rate per unit time is controllable by means of the revolution velocity of the rotor. Reversed transfer can also be performed by reversing rotation of the rotor.

By using the "Mohno Pump", a gas-liquid mixed fluid, of which the intermixed gas occupies 50% by volume or less, can also be pressure-transferred without suffering a decrease in the pressure transferring capacity and the mixing proportion of the gas and liquid and the flow rate can be adjusted/varied freely.

A pressure can be applied to the liquid passing a line atomizer. It is optional that a pressure is applied before introduction of a gas into a liquid by providing an appropriate pressurizer and the pressure can be varied by having different incoming diameter and outgoing diameter of the gas-liquid pressure-transfer pump or by having different incoming diameter and outgoing diameter of the atomizer. Accordingly, a contribution can be made to the dissolution of a gas into a liquid since, generally speaking, the solubility of a gas is increased under a high pressure.

It has been found that, when a pressurized fluid of a gas-liquid mixture is introduced into the above-described gas-liquid mixer ("OHR line mixer"), ultrasonic waves of around 40 kHz are generated in the gas-liquid mixer to act on the fluid. When the pressure is increased, the frequency of the ultrasonic waves is increased as a trend and the intensity of the ultrasonic waves is also increased as a trend.

It is known that ultrasonic waves have a higher unit energy as the frequency is increased and the effect of the ultrasonic waves is also higher. With regard to cavitation (a cavity-forming phenomenon) closely correlated to generation of ultrasonic waves, on the other hand, the flow velocity of the gas-liquid dual phase passing through the atomizer is increased as the pressure at the inlet to the atomizer is increased leading to more vigorous generation of the cavitation. Accordingly, it could readily be understood that a pressure as high as available at an economical level is desirable.

It would be difficult by mechanical agitation/cutting performance alone in order for ultrafine bubble formation and ultrafine mixing of a gas-liquid to reach a nanometer level and ultrafine bubble formation and ultrafine mixing could be accomplished only by increasing the flow velocity of the gas-liquid dual phase to generate cavitation and ultrasonic waves exhibiting a synergistic effect with vortex flows.

It is well known that the factor of pressure is important for dissolving/dissolution of a gas and a higher pressure is more advantageous. By taking these facts into general consideration, the pressure range in the present invention is selected in the range of about 0.0981 MPa to about 5.394 MPa (1 to 55 kg/cm$^2$).

Here, in a simple returning process of biosolid ("0" amount addition of reactive gas), it is also required to conduct the running at a low-pressure level so as not to destroy the microorganisms. Besides, the practically attainable high pressure (about 5.394 MPa) is targeted in order that, in the oxidation/decomposition of biosolid with a reactive gas containing ozone in a high concentration, the oxidizing/decomposing performance by the synergistic effect of the oxidizing/decomposing performance of ozone in itself and the effect of cavitation/ultrasonic waves obtained under a high pressure as well as the performance due to O radicals and OH radicals can be efficiently utilized.

In the present invention of which the subject matter is waste water treatment by the biosolid method treating a huge amount, the utilization ranges relative to the ultrasonic waves are taken within the economically easily utilizable ranges so as to select the frequency in the range of 20 kHz generated at a low-pressure level to 12000 kHz obtained at a high-pressure level (about 5.394 MPa).

As the supply unit of oxygen and/or ozone, ozone generators capable of adjusting oxygen supply and generation of ozone can be utilized. For example, it can be an oxygen/ozone cycle generator having an ozone-generating element with an electrode formed on a dielectric body and a high-frequency, high-voltage power source capable of applying a high-frequency AC voltage to this ozone-generating element, in which, under supply of an oxygen-containing gas to the ozone-generating element, the voltage and/or frequency of the power source are handled with an adjuster enabling the amount of ozone generation and it can be an oxygen/ozone cycle generator capable of being adjustable for the amounts of oxygen and ozone supply corresponding to the variation in the water-quality loading variations in the waste water treatment and others corresponding to morning/daytime/night or corresponding to the process mainly for oxygen supply or corresponding to the process mainly for oxygen supply and the process mainly for oxidative decomposition by ozone.

The supply of the reactive gas containing oxygen can be air, can be an oxygen-enriched air or can be pure oxygen. Taking the amount of ozone generation as zero, it is also possible to send out the supplied gas as such. It can sometimes be the case, needless to say, that the oxygen/ozone generator is interrupted.

The cycle here implied means alteration/circulation by adequate selection of the processes including oxygen aeration, oxygen aeration accompanied by activation of microorganisms by the addition of a trace amount of ozone and ozone oxidation, intermittent processes and others and the basic cycle consists of addition of oxygen for biochemical interaction and/or addition of a trace amount of ozone for activation of microorganisms-addition of (a large amount on ozone for physical oxidation-non-addition of a gas for an anaerobic reaction (as to the intermittent process, it is essential to interrupt supply of a more than necessary amount of a gas and to simultaneously ensure a sufficient anaerobic time [the time taken for carrying out the biochemical reaction under an anaerobic environment] as a countermeasure against denitridation and degradation of the biochemical reactivity). In the case of waste water, it can be accomplished that the treatment times taken for a treatment are about identical despite the variation in the waste water loading by adjusting the supplied amount of the reactive gas in compliance with the cycle of livings affecting the variation of the waste water loading. Besides, it is possible, by adjusting the length of each of the cycles constituting the basic cycle including oxygen aeration and/or oxygen aeration accompanied by activation of microorganisms with addition of a trace amount of ozone, ozone oxidation and intermission (interruption of gas supply), to select an optimum cycle of the whole system enabling energy-saving running.

In the prior art technology, it was impossible to appropriately supply a sufficient amount of the reactive gas at an appropriate time so that the physicochemical reactions could not be promoted and, for example, the aeration must be continued for as long as 24 hours.

Prior to the present invention, no attempts had ever been undertaken for oxygen aeration necessitating pressure-transfer of a large volume in a high gas proportion as compared with ozone oxidation in a waste water treatment system although some attempts had been undertaken to admix a few volume % of high-concentration ozone gas with the waste water (official publication of Patent Kokai No. 7-124577) for the reasons of the limit in the gas-liquid mixing proportion and the undissolved solid matter in the waste water.

By utilizing the treatment with the line atomizer system of the present invention for dissolving/staying/storage of oxygen in the returned biosolid water, it is now possible to instantaneously supply oxygen required by microorganisms for the biochemical action, possible to supply an ozone-containing reactive gas in a desired amount at a desired timing and possible to adequately supply a desired gas instantaneously so that an aeration cycle with air, aeration cycle with oxygen, oxidation/decomposition cycle with an ozone-containing reactive gas and others can be selected/set as desired, the time which depends on the time factor necessary for the microbial reactions including the biochemical reaction and others can be incorporated into the inside of operation of the system and it is now possible to unitarily control the respective processes including the intermittent processes by means of the treatment by use of the line atomizer system of the present invention.

Following is a description of a construction of the line atomizing waste water treatment method according to the present invention by the biosolid method by using a line atomizer system described above comprising a line atomizer, gas-liquid pressure-transfer pump and oxygen/ozone cycle generator in which a synergistic effect is exhibited in the process including the anaerobic/aerobic reactions, oxygen and ozone (trace amount to high concentrations) and functions of ultrasonic reactions and functions by cavitations as well as a control system for controlling the same.

Figure 3:
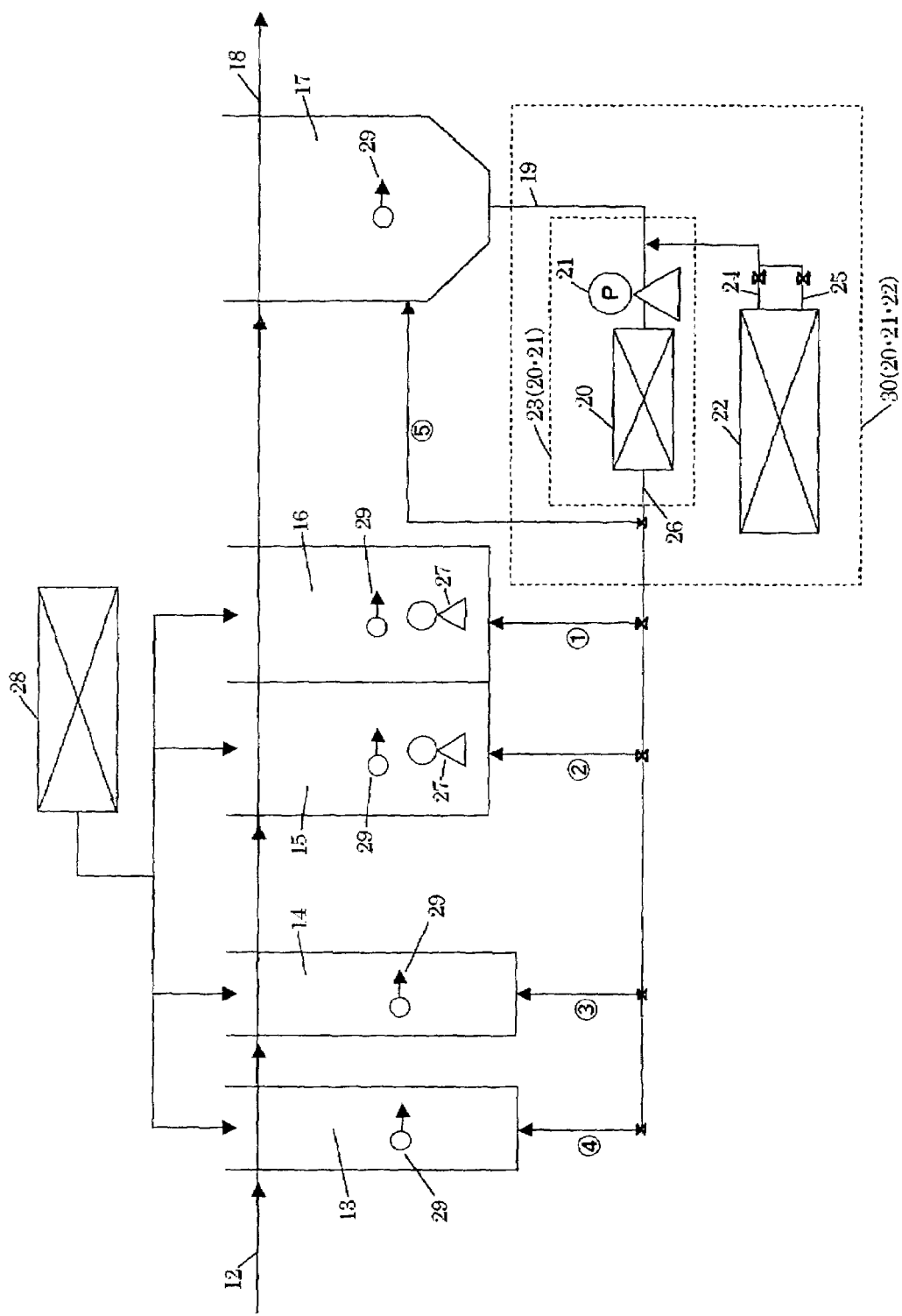
FIG. 3 is an illustrative drawing showing a basic apparatus constitution which can actually conduct the line atomizing method for biosolid water in the present invention.

FIG. 3 illustrates a basic apparatus assembly for actually carrying out the line-atomizing waste water treatment method in the bio-solid method of the present invention.

In FIG. 3, the waste water 12 is introduced into the waste water treatment system and, via a (flow rate) adjustment vessel 13 and settling vessel 14, freed from pollutant materials of inorganic nature and, after being subjected to an action of anaerobic microorganisms in a reaction vessel 15 (anaerobic), the organic matters are converted into a biosolid in a reaction vessel 16 (aerobic) by aerobic microorganisms. The waste water treatment fluid in which the organic matters have been immobilized as a biosolid by means of aerobic microorganisms in the reaction vessel (aerobic) 16 is sent to a biosolid settling vessel 17 together with the biosolid. The supernatant is discharged to outside of the waste water treatment system. Incidentally, the supernatant 18 is sometimes subjected further to an advanced treatment.

In the prior art technology, a part of the biosolid by settling in the biosolid settling vessel is introduced, via a biosolid-suction pipeline 19, into the reaction vessel 17 as the returned biosolid for recycling utilization of the aerobic microorganisms while the remainder of the biosolid is disposed in another way as the excessive biosolid.

In the present invention, connection is made, to the biosolidsuction pipeline 19, of a line atomizer system 30 consisting of an atomizer 20, a gas-liquid pressure-transfer pump 21 and an oxygen/ozone cycle generator 22. The oxygen/ozone cycle generator 22 is provided with a pipeline 24 for a reactive gas containing oxygen and a pipeline 25 for a reactive gas containing oxygen and ozone wherein suction is carried out for either one of the reactive gases by valve operation. Optionally, the oxygen/ozone cycle generator 22 can be connected to the preceding stage of the gas-liquid pressure-transfer pump 21. Further, the line atomizer system 30 is not limited to that connected to the bio-solid-suction pipeline 19 of the biosolid settling vessel 17 but can be connected to the supernatant coming from the biosolid settling vessel 17 or the water coming from outside of the waste water treatment system (the supernatant and the water coming from outside of the waste water treatment system are called clean water as a general term).

Connections are made to the respective vessels from the line atomizer system through a pipeline for returning/introducing.

Incidentally, 27 is a stirrer for agitating inside of the reaction vessel (anaerobic) 15/reaction vessel (aerobic) 16 and 28 is a dispenser system for a microbial preparation optionally provided according to desire.

In the following, some exemplary descriptions are given on the possibility of the treatments of waste water which can be undertaken by the line atomizing waste water treatment method of the present invention in the biosolid method.

Into the water arriving at the atomizer 20 such as, for example, returned biosolid water (also maybe clean water), mixing is made by suction of a reactive gas containing oxygen (abridged as oxygen gas hereinafter) or a reactive gas containing oxygen and ozone (abridged as ozonating gas hereinafter) coming from the oxygen/ozone cycle generator 22.

The gas-dispersion liquid in which the oxygen gas/ozonating gas is dispersed as converted to ultrafine bubbles by the line atomizer 23 is sent, depending on the types and contents of the treatment, to the respectively specified processes (vessels or pools).

In the biosolid method, the microorganisms and the like to carry out the biochemical reaction are used repeatedly by using the micro-organisms and the like by returning the treated water containing a part of the biosolid (returned biosolid) to the waste water inlet side.

When the water under treatment is a water containing organic matters in a high concentration and the biochemical reaction by micro-organisms must be carried out rapidly, it is desirable that the dissolved oxygen in the water under treatment is increased as high as possible or the dissolved oxygen is replenished immediately as it is consumed.

It is easy in the present invention to have compliance by subjecting the returned biosolid water for returning the biosolid and the oxygen water for a necessary amount of oxygen to the line atomizer treatment for returning to the reaction vessel (aerobic) 16 (also called an aerobic vessel) (① in FIG. 3). This is because the biochemical reactions by microorganisms and others can be greatly promoted by supplying a sufficient amount of oxygen within an extremely short time in the dissolved form and in the form of ultrafine bubbles, In this case, a large proportion of the oxygen gas added to the water under treatment (gas-liquid ratio) is suitable. For example, it is possible that the pressure-transfer gas-liquid ratio is increased as high as 50% by volume and it is also possible that the dissolved oxygen in the water under treatment is increased to supersaturation of 40 mg/liter or higher by using pure oxygen enabling disposal of a high-loading waste water.

The oxygen is converted into ultrafine bubbles by the treatment in the line atomizer 23 and a part thereof is rapidly dissolved in the water under treatment with simultaneous consumption by the actively proceeding biochemical reactions but oxygen is supplied instantaneously and continuously from the bubbles dispersed and stored in the water under treatment in a large amount as ultrafine bubbles.

As is mentioned before, a long time is taken by the ultrafine bubbles for ascending to reach the surface of the reaction vessel 16 so that a large amount of the ultrafine bubbles are dispersed/stored in the reaction vessel 16 during the ascending up to the surface of the reaction vessel 16 enabling continuous replenishment of the dissolved oxygen. By maintaining the amount of the dissolved oxygen at a somewhat high level throughout the whole volume within the reaction vessel 16, the biochemical (oxidation) reactions in the reaction vessel 16 can be fully accelerated. It is very effective here to agitate the liquid in the reaction vessel 16 by means of the stirrer 27.

Due to the biochemical activity of microorganisms in the reaction vessel, a part of the organic matters in the water under treatment is decomposed into carbon dioxide and water by self-digestion while a part of the organic matters is consumed by the biosolid microorganisms to cause multiplication of the microorganisms and increase of the biosolid.

In this case, activation of the microorganisms for conducting the biochemical reactions can be accomplished when, in addition to the addition of oxygen, the water under treatment contains/is under action of a trace amount (for example, 0.01 to 0.04 mg/liter or smaller=ppm or smaller) of ozone. It is a possible case that the microorganisms are destroyed/killed with too much ozone.

It is also possible that the returned biosolid (sometimes called excessive biosolid heretofore) water among the water under treatment containing returned biosolid, of which the proportion having been converted into biosolid by the biochemical reactions of microorganisms and others is high, can be disposed. In this case, biosolid can be oxidized/decomposed with ozone by feeding/mixing an ozonating gas having an increased concentration of ozone.

Oxidation/decomposition of the returned biosolid with ozone can be accelerated/strengthened more and more to be carried out instantaneously by the complex synergistic effect of the effect of conversion of the ozonating gas into ultrafine bubbles by the line atomizer 23, the effect of pressurization, the effect of ultrasonic waves, the effect of cavitation on the reaction, the effect of reactions with O radicals and OH radicals and others.

When a large portion of the biosolid is converted to BOD by the oxidation/decomposition of the biosolid with ozone, it is introduced from the line atomizer 23 into the reaction vessel (anaerobic) 15 (② in FIG. 3) where it is acted upon by the anaerobic microorganisms and thereafter is subjected in the reaction vessel (aerobic) 16 again to the bio-chemical reaction by aerobic microorganisms to be converted into bio-solid. The amount of the biosolid produced here by the self-digestion of a part thereof is decreased.

When a large portion of the cell membranes in the biosolid is destroyed by the oxidation/decomposition of the returned biosolid with ozone to be imparted with increased susceptibility to the reaction of the microorganisms, it is possible, instead of introduction from the line atomizer 23 to the reaction vessel (anaerobic)15, to introduce into the adjustment vessel 13 (④ in FIG. 3), which is a process preceding the reaction vessel (anaerobic) 15 or is optionally to introduce into the settling vessel 14 (③ in FIG. 3).

In this case, in order to more efficiently utilize the unutilized oxygen stored in a large amount in a dissolved form/in the form of ultrafine bubbles in the treated water after conversion into BOD, it is also practiced that a seed biosolid as required is added beforehand to the adjustment vessel or settling vessel to further promote the biological oxidation.

When, in the usual case of ozone preparation where a part of the oxygen gas is converted into ozone, ozone in a high concentration (ozone concentration about 3 to 6% by volume) is to be generated, a gas of high oxygen concentration is used. For example, the reactive gas immediately after generation has a composition expressed by an oxygen concentration of 85% by volume, 5% by volume of ozone concentration and 10% of others and the balance portion of the constituents in the reactive gas after consumption of the ozone are mostly unreacted oxygen with a concentration reaching 89.5% to be higher than in generation. In the present invention, the gas dispersion liquid which has been once used for ozone oxidation/decomposition after consumption of ozone still keeps a large amount of oxygen stored in a dissolved form or in the form of ultrafine bubbles so that the utilization efficiency of the reactive gas can be greatly increased by returning this gas-dispersion liquid containing a large amount of oxygen to appropriate positions so as to again utilize the stored oxygen for the biochemical reaction. Simultaneously therewith, it is possible to convert each of the prior art vessels which is uni-functional, to composite-functional.

According to the present invention, the utilization efficiency of ozone is high and it can be supplied to the disposal system in an adequate amount required for oxidation/decomposition without need of excessive supply so that there is no risk of out-of-system discharge of noxious unreacted ozone.

When a seed biosolid is returned to the reaction vessel (anaerobic) to conduct the denitrification so as to be imparted with increased susceptibility to the next-coming aerobic reaction or to undertake a countermeasure against degradation of the biochemical reaction performance, it is desirable to use a seed biosolid with a "zero" amount of gas addition.

In the line atomizing waste water treatment method of the present invention by the biosolid method, it is also possible that, when a reactive gas containing a trace amount of ozone in an ozone concentration of 0.01 mg/liter or higher but not exceeding 0.04 mg/liter and pure oxygen are treated with a returned biosolid water under a feed pressure of 0.25 to 0.61 MPa to the line atomizer 23, a control is effected at the part of the line atomizer for preventing occurrence of biosolid (biosolid) by means of the synergistic chemical effect of oxygen aeration/biochemical activity and ozone oxidation/biological oxidation. In this case, it is possible that the treated water is introduced into the biosolid settling vessel 17 ((⑤) in FIG. 3) which is a process succeeding the reaction vessel 16 and the supernatant is released toward outside of the system.

According to the present invention, bubbles of the ozone gas are ultrafine so that a long time is taken for ascending thereof up to the water surface resulting in an increased utilization efficiency of ozone and, in addition, even in the case where ozone has been transferred in some excessive amount, no risk is encountered that noxious unutilized ozone gas is released to outside of the system even without undertaking any particular detoxifying measure because ozone per se is decomposed due to the balance with the durable life of ozone.

It is not always necessary in the present invention to undertake a continuous oxygen supply so that a time margin is provided until completion of the biochemical reactions and that time can be utilized for undertaking other measures (unification). By undertaking generalized control/management of the addition of oxygen and ozone to the returned biosolid water, selection of the intermittent processes, setting of the cycle time, amount of oxygen, ozone concentration in the ozonating gas, pressure of the added reactive gas, flow rate and others to determine the optimum cycle, the present invention can be practiced by means of a control/managing system for unified management by sending orders to the cycle generator for generation/supply of a desired reactive gas and to the atomizer/gas-liquid pressure-transfer pump for forming a desired gas-dispersion liquid.

It is optional that the place for installation of this control/management system is within or in the vicinity of the plant to be controlled/managed or a distant place. This control/management system may serve for concurrent control/managing of a plurality of plants.

This control/managing system is equipped with a group of sensors for measuring/detecting the dissolved oxygen (DO), oxidation-reduction potential (ORP), pH, concentration of suspended substances such as biosolid and the like (MLSS), water quality conditions in the in-flow and out-flow waters, BOD, COD, SS, T-N, T-P values in the respective processes including the reaction vessel and the like and, based on the detected/collected data, the process control can be optimized for the water quality conditions of the discharged treated water. It is now possible to realize the amount of dissolved/stored oxygen for effecting the biochemical reactions by microorganisms and the like optimized relative to the discharged water loading conditions, the amount/size of the oxygen gas bubbles and the synergistic effect of the microbiological oxidation and the ozone physical oxidation/cavitation/ultrasonic waves and a possibility is given for realization to apply the cycle atomizing process by which the respective lasting times can be adjusted and they are switched each to the other for practicing the same.

By utilizing the principle that, when oxygen gas bubbles are imparted with fineness of 1 μm or smaller, the ascending velocity of the bubbles in water is retarded to a few cm/hour so that undissolved oxygen is dispersed/staying/stored in the treated water, an alteration is effected in the concept of each of the vessels considered as monofunctional in the prior art waste water treatment processes when the returned biosolid water having oxygen as mixed, dissolved and stored by means of the line atomizer into the flow-rate adjusting vessel, settling vessel, reaction vessel and others, as described below.

1. Flow-rate adjusting vessel=converted into multiple functionality with addition of the function of biochemical interaction treatment vessel
2. Settling pool (vessel)=converted into multiple functionality with addition of the function of biochemical interaction treatment vessel
3. Reaction vessel=capacity increased, or decreased or omitted depending on situations
4. Biosolid settling pool (vessel)=converted into multiple functionality with addition of the function of biochemical interaction treatment vessel The waste water as the target of the disposal in the present invention is that having a BOD value approximately in the range of 50 to 200000 mg/liter. It is an understanding heretofore that the waste water from farming and fishing villages having a BOD value of 50 to 150 mg/liter are not suitable for the collective biosolid method due to the usually low BOD value and low treatment efficiency per unit BOD as compared with the waste water from cities having a BOD value of approximately 150 to 300 mg/liter. According to the present invention, however, it is possible to undertake an automatic running by utilizing the unified control/management system by means of a line atomizer so as to ensure a high utilization efficiency of the reactive gas and, by virtue of the storage function for a large amount of the reactive gas by way of conversion into ultrafine bubbles so as to enable a necessary minimum running (intermittent/paused running) so that the cost for running/maintenance is low and the efficiency of disposal per unit BOD can be greatly increased as compared with prior art.

In the prior art, it was taken as impossible to conduct disposal of a high-concentration waste water (BOD value 200000 mg/liter) and, for example, high-concentration waste water having a BOD value of 10000 mg/liter was subjected to disposal after 10 to 20 times dilution to give a BOD value of 500 to 1000 mg/liter.

In the present invention, on the other hand, it is possible to conduct disposal of a high-concentration waste water having a BOD value of 200000 mg/liter because oxygen for the biochemical interaction or high-concentration ozone for oxidative decomposition by ozone necessary for disposal of high-concentration waste water can be supplied within a short time in a necessary and sufficient amount in a dissolved form or in the form of ultrafine bubbles.

On the other hand, the concentration of a stored biosolid with a water content of about 80% is 20% by weight corresponding to 200 g/liter=200000 mg/liter so that a biosolid concentration of 200000 mg/liter is an actually possible case. According to the line-atomizing method of the present invention, however, even a stored biosolid of such a high concentration can be fully complied with by means of the high efficiency in the ozone oxidation/decomposition and BOD-forming treatment using high-concentration ozone by a line atomizer of a very high capacity per time for one-pass instantaneous treatment (0.5 second or shorter), improvement in the efficiency of biological oxidation with a large amount of oxygen supply and expansion of the treatment capacity in the whole disposal system by way of imparting multiple-functionality to the vessels and pools with returning also to the adjustment vessel, first settling pool (vessel) and others.

UTILIZABILITY IN INDUSTRY

The present invention is characterized in that, in a waste water treatment process by the biosolid method, the functions to ultrafine bubble formation, mixing and storage functions of a reactive gas, functions to generate cavitations/ultrasonic waves and a controlling function to unify these functions for exhibition of a synergistic effect are provided and, by using a line atomizer treatment, clean water or returned biosolid water is subjected to oxygen aeration and/or ozone oxidation and the gas-dispersion liquid is returned to the reaction vessel or to the adjustment vessel or settling vessel as a preceding process to the reaction vessel, or to the biosolid settling vessel as a process succeeding thereto and the like.

The line-atomizing waste water treatment method of the present invention is effective for solving the problems in the prior art as follows.

① The water for treatment can be provided with an amount of dissolved oxygen/an amount of dissolved ozone required instantaneously when needed. Accordingly, the reaction for disposal of the water under treatment can greatly be activated. For example, aeration (dissolution of oxygen into the liquid and oxygen supply to microorganisms) can be carried out within an extremely short time by the treatment with a line atomizer so that the staying time of the water for disposal in the reaction vessel (aerobic/aeration) can be very short (or, it is possible that the reaction vessel (aeration) is required no longer). Further, the bio-chemical reactions, which, in the prior art, take a staying time as long as days, can be accomplished sufficiently with a staying time of a few hours order.

② By supplying the oxygen gas or ozone gas to be added to the water under treatment instantaneously and in a large amount to cause dispersion/storage in the water for treatment, continuous running of aeration for 24 hours a day as in the prior art is no longer necessary enabling intermittent running and enabling repetition of the anaerobic denitrification process, which is sometimes insufficient in the prior art so as to ensure sufficiency of the anaerobic denitrification process. Moreover, the utilization efficiency of the reactive gas is extremely high so that the oxygen gas and ozone gas can be supplied in a minimum necessary amount without requirement for a supply in an excessive amount. Even in the case where ozone is added, accordingly, there is no need for extraneous facilities to detoxify noxious ozone in conducting discharge to outside of the system.

To say particularly:
(a) excessive biosolid is formed in a reduced volume or not formed;
(b) the power consumption for aeration can be decreased to one fifth to one tenth or smaller to effect energy saving;
(c) separate installation of exclusive-use ozone-oxidation vessel, depleted ozone disposal unit, air-oxygen disperser unit, withdrawal pump for excessive biosolid and the like are no longer required;
(d) by imparting the function of biochemical activity to the adjustment vessel and settling pool (vessel), the reaction vessel can be made compact or can be omitted;
(e) compactness can be accomplished to one fifth to one tenth or smaller as compared with prior art so that the requirement for space can be decreased;
(f) in the prior art low-performance uncontrollable system of the non-control type, the dissolving/utilization efficiency of oxygen and ozone as a hardly soluble gas was extremely low to be a few % to about 20% and no measure other than long-time continuous aeration could be undertaken. Relative to the pressure, for example, control was impossible because of the utilization of the tank water depth pressure. While, due to the impossibility to comply with variations in the gas-liquid mixing proportion and loading in the treated waste water, no choice could be made excepting for long-time aeration of constant and large amount of air, it remained only for use in a process with very limited possibility for automation, energy saving and IT utilization, it is now possible to increase the dissolving/utilizing efficiency nearly to 100%;
(g) a possibility can be afforded for the disposal of high concentration/high loading waste water including human excrements, animal excrements, discharged water from factories, waste water of garbage disposal in disposers and the like heretofore considered impossible;
(h) possibilities are given for the in-system disposal of excessive bio-solids and garbage disposal in disposers unnecessitating incineration disposal of biosolids and garbages in the prior art contributing to the decrease of $CO_2$ and financial saving; and (i) by way of prevailed utilization of disposers, collection and transportation of garbages and biosolids are no longer required contributing to the improvement of convenience and amenity of inhabitants.

The invention claimed is:

1. A method for the treatment of waste water from an activated sludge process which comprises:
   a. admixing waste water from an activated sludge process or clean water with 50 volume % or less of reactive gas consisting essentially of oxygen or a mixed gas consisting essentially of oxygen and ozone to form an aqueous medium,
   b. subjecting said aqueous medium in an in-line atomizer to a pressure of about 0.981 to 5.394 MPa to generate cavitation and ultrasonic waves of 20 to 12,000 kHz, whereby O/OH radical molecules/atoms are formed, so that the reactive gas is dissolved to the limit and the remainder, if any, of the reactive gas is dispersed and mixed bubbles of 1 nm to 30,000 nm diameter, forming a reactive gas-dissolved/dispersed liquid and
   c. introducing the reactive gas-dissolved/dispersed liquid into the waste water being treated.

2. The method of claim 1 in which the BOD loading of the aforementioned waste water under treatment is in the range from 50 to 200000 mg/liter.

3. The method of claim 1 in which the concentration of ozone in the aforementioned reactive gas is adjusted to 0.01 to 0.04 mg/liter so as to cause self-oxidative annihilation of the activated sludge.

4. The method of claim 2 in which the concentration of ozone in said reactive gas is adjusted to 0.01 to 0.04 mg/liter so as to cause self-oxidative annihilation of the activated sludge.

5. The method of claim 1 in which the length of time taken for up-to-limit dissolution of the reactive gas in the atomizer does not exceed 0.5 second.

6. The method of claim 2 in which the length of time taken for up-to-limit dissolution of the reactive gas in the atomizer does not exceed 0.5 second.

7. The method of claim 3 in which the length of time taken for up-to-limit dissolution of the reactive gas in the atomizer does not exceed 0.5 second.

8. The method of claim 4 in which the length of time taken for up-to-limit dissolution of the reactive gas in the atomizer does not exceed 0.5 second.

* * * * *